United States Patent [19]

Yasuhara et al.

[11] Patent Number: 5,271,252
[45] Date of Patent: Dec. 21, 1993

[54] STEERING SHAFT LOCKING DEVICE

[75] Inventors: Nobuyoshi Yasuhara; Tomonori Kawachi, both of Aichi, Japan

[73] Assignee: Kabushiki Kaisha Tokai Rika Denki Seisakusho, Aichi, Japan

[21] Appl. No.: 789,313

[22] Filed: Nov. 8, 1991

[30] Foreign Application Priority Data

Nov. 9, 1990 [JP] Japan ............................ 12-118227[U]

[51] Int. Cl.$^5$ .............................................. B60R 25/02
[52] U.S. Cl. ........................................ 70/186; 70/252
[58] Field of Search ...................... 70/186, 184–185, 70/252

[56] References Cited

U.S. PATENT DOCUMENTS

| | | | |
|---|---|---|---|
| 3,940,958 | 3/1976 | Kuroki | 70/186 |
| 4,773,241 | 9/1988 | Peitsmeier et al. | 70/185 |
| 4,798,067 | 1/1989 | Peitsmeier et al. | 70/252 |
| 4,972,692 | 11/1990 | Morikawa et al. | 70/186 |
| 5,036,686 | 8/1991 | Ichinose | 70/186 |

FOREIGN PATENT DOCUMENTS

| | | | |
|---|---|---|---|
| 0390089 | 10/1990 | European Pat. Off. | 70/252 |
| 62-132856 | 8/1987 | Japan . | |
| 62-139764 | 9/1987 | Japan . | |

*Primary Examiner*—Peter M. Cumomo
*Assistant Examiner*—Darnell M. Boucher
*Attorney, Agent, or Firm*—Finnegan, Henderson, Farabow, Garrett & Dunner

[57] ABSTRACT

The present invention relates to a steering shaft locking device in which a locking member is normally urged towards a lock position by a spring member, and is moved to a release position by the cam protrusion of a cam member when a key rotor is turned to an operating position. A key response member operates in such a manner that, when the locking member is moved to the release position with the key response member moved in a first direction upon insertion of the key into the key rotor, its end portion engages with the engaging portion of the locking member to hold the locking member at the release position, and that, when the key response member is moved in a second opposite direction upon extraction of the key from the key rotor, the end portion disengages the engaging portion, thus allowing the movement of the locking member to the lock position. A locking protrusion of the cam member has an end portion which, when the key rotor is turned to the locking position, is engaged with a stopper member, thus inhibiting the movement of the locking member to the release position. Thus, the locking member cannot be moved to the release position until the key rotor is turned to the operating position with the key inserted into it.

6 Claims, 5 Drawing Sheets

DIRECTION OF P ARROW

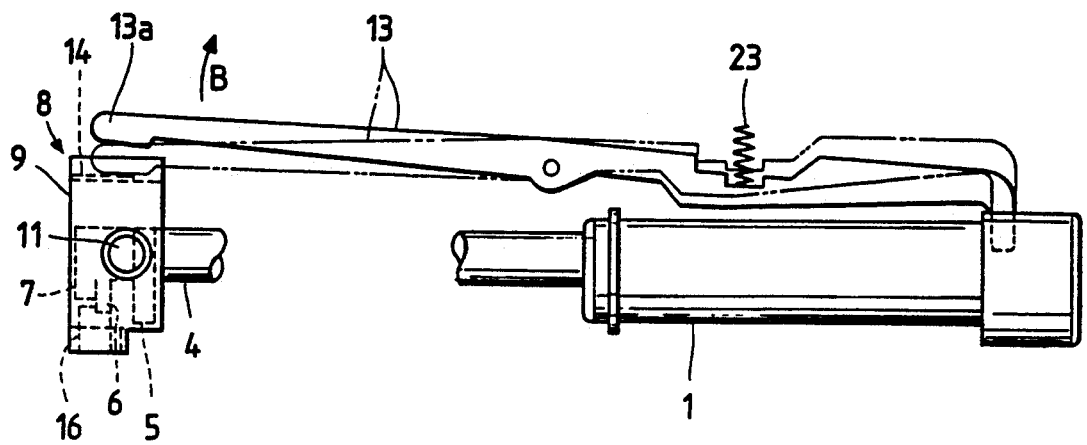
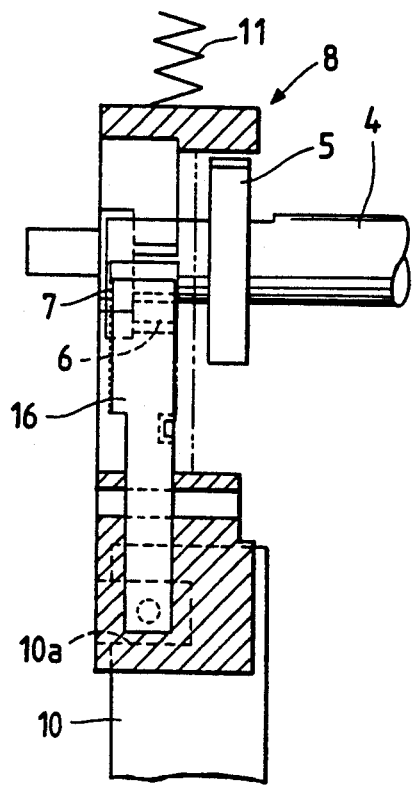

DIRECTION OF Q ARROW

STEERING SHAFT LOCKING DEVICE

BACKGROUND OF THE INVENTION

1. Field of the Invention

The present invention relates to a steering shaft locking device which locks a steering shaft upon the removal of a key from a key rotor which has been turned to the locking position with the key.

2. Discussion of the Related Art

In a typical steering shaft locking device, when a key is removed from a key rotor which has been turned to the locking position (LOCK position) with the key, a locking member is moved by the elastic force of a spring to a lock position to engage a groove formed in a collar fixedly mounted on a steering shaft, thereby locking the steering shaft and preventing its rotation. When the key is inserted into or extracted from the key rotor and the rotor is in the LOCK position, a key response member pivots with the insertion and extraction of the key. When the key rotor is turned to any one of the operating positions (ACC, ON and START positions) with the key, a cam member is turned together with the key rotor, so that the locking member is moved to a release position against the elastic force of the spring; that is, the locking member is disengaged from the groove formed in the collar. Thus, the steering shaft has been unlocked and may rotate. In this operation, the key response member, engages an engaging portion of the locking member, so that the locking member is held at the release position.

As was described above, the locking member is urged to the lock position by the elastic force of the spring. Such a device may be overcome undesirably to allow rotation of the steering shaft by insertion of a dummy key into the key rotor held at the LOCK position. A dummy key of this sort can fit into the key rotor, but will not allow the key rotor to turn. If the locking member is pushed toward the release position against the elastic force of the spring by some method, the locking member is moved to the release position and held there by the key response member. Thus, the steering shaft can be unlocked with only a dummy key and without turning the key rotor.

In order to eliminate the above-described difficulty, the present applicant has proposed the steering shaft locking device disclosed in Japanese Utility Model Application No. 21286/1986. This steering shaft locking device includes a stopper member movably coupled to the locking member, and a cam plate having a locking portion for a cam member which is turned together with the key rotor. When the key rotor is turned to the LOCK position, the cam rotates, causing the locking portion of the cam plate to abut a stopper part of the stopper member, and preventing the movement of the locking member to the release position. The locking member cannot be moved to the release position until the key rotor is turned to an operating position with the key, whereupon the locking portion of the cam plate disengages a stopper part of the stopper member.

However, the above-described steering shaft locking device has several disadvantages. For example, since the cam plate having the locking portion is separate from the cam member, a large number of components in the steering shaft locking device is required. Similarly, assembly of the locking device requires a large number of assembling steps.

SUMMARY OF THE INVENTION

In view of the foregoing, an object of the present invention is to provide a steering shaft locking device in which the locking member is not moved to the release position until the key rotor is turned to an operating position with a key able to rotate with the key rotor.

Another object of the present invention is to provide a steering shaft locking device in which the locking member cannot be moved to the release position with a dummy key not able to rotate with the key rotor.

A further object of the present invention is to provide a steering shaft locking device which has fewer components and requires fewer assembly steps than a conventional steering shaft locking device.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

The foregoing objects and other objects of the invention have been achieved by the provision of a steering shaft locking device which, according to the present invention, comprises a key rotor having a locking position and a plurality of operating positions, the key rotor allowing a key to be inserted thereinto or extracted therefrom when positioned at the locking position, and which is capable of being turned to the locking position and operating positions with the key inserted thereinto, a cam member having an outer cylindrical surface and a cam protrusion extending from the outer cylindrical surface, the cam member being turned together with the key rotor, a locking member which can be reciprocated between a lock position for locking the steering shaft and a release position for unlocking the steering shaft, and which is normally urged towards the lock position by a spring member, and is moved to the release position by the cam protrusion when the key rotor is turned to any one of the operating positions. The locking member includes an engaging portion, a key response member which is moved in a first direction when the key is inserted into the key rotor, and in a second opposite direction when the key is extracted from the key rotor, the key response member having an end portion which, when the key response member is moved in the first direction upon insertion of the key into the key rotor and the locking member is moved to the release position, engages the engaging portion to hold the locking member at the release position, and which, as the key response member is moved in the opposite direction upon extraction of the key from the key rotor, disengages the engaging portion, thus allowing the movement of the locking member to the lock position. A stopper member is coupled to the locking member, and a locking protrusion forming a part of the cam member, the locking protrusion having an end portion which, when the key rotor is turned to the locking position, contacts the stopper member, thus inhibiting the movement of the locking member to the release position.

When the key rotor is turned to the LOCK position, the end portion of the locking protrusion of the cam member abuts the stopper member, thus preventing the movement of the locking member to the release position. Thus, the locking member cannot be moved to the release position until the key rotor is turned to an operating position with the key inserted into it.

The locking protrusion contacting the stopper member is a part of the cam member. Hence, the steering shaft locking device of the invention requires a smaller number of components than the conventional steering shaft locking device in which the cam plate and the cam member are provided separately.

The nature, utility and principle of the invention will be more clearly understood from the following detailed description and the appended claim when read in conjunction with the accompanying drawings.

BRIEF DESCRIPTION OF THE DRAWINGS

FIG. 2 is a top view showing essential components of the steering shaft locking device according to the present invention;

FIG. 3 is a side partial sectional view showing essential components of the steering shaft locking device according to the present invention;

DETAILED DESCRIPTION OF THE INVENTION

One preferred embodiment of this invention will be described with reference to the accompanying drawings.

Figure 5:
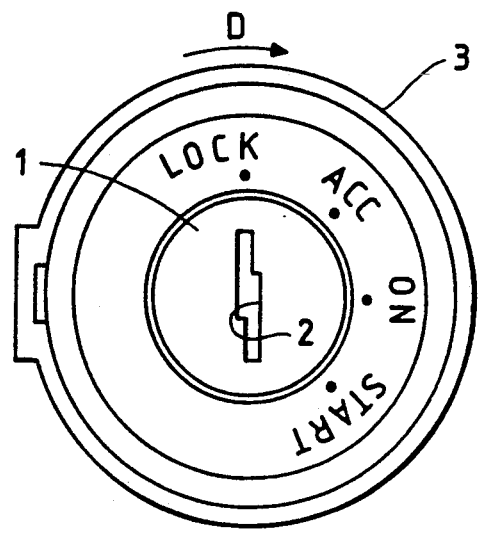
FIG. 5 is a front view showing a key rotor.

As shown in FIG. 5, a key rotor 1 with a key hole 2 is accommodated in a casing 3 in such a manner that the key rotor is rotatable clockwise in the direction of arrow D from a locking position (LOCK position). When the key rotor 1 is set at the LOCK position, the key can be inserted into the key hole 2 or extracted from it. The key rotor 1 can thus be turned clockwise in FIG. 5 from the LOCK position to any of the operating positions (ACC, ON and START positions) in the stated order, and from any of the operating positions counterclockwise in FIG. 5 to any other position in the reverse order. When the key rotor 1 is at any of the operating positions, the key cannot be inserted into or extracted from the key hole 2.

As shown in FIGS. 1A through 4, a cam member 4 is provided on the end of the key rotor 1 in such a manner that it turns together with the key rotor 1. The cam member 4 includes a cam protrusion 5, a locking protrusion 6 and an auxiliary cam 7 which are arranged axially.

As further shown in FIGS. 1A through 4, the present invention includes a locking member 8 comprising a rectangular movable frame 9 arranged as to surround the cam member 4. A lock bar 10 has an engaging portion, one end portion 10a of which is engaged with the movable frame 9. The locking member 8 is vertically movable in the positions shown in FIGS. 1A and 3. The locking member 8 is urged toward the locking position, or in the direction of the arrow A in FIG. 1A, by a compression coil spring comprising a spring member 11 arranged between the movable frame 9 and the casing 3. When the locking member 8 is at the lock position, the end portion 10b of the lock bar 10 is engaged with a groove 24 formed in the collar 26 which is fixedly mounted on the steering shaft 26, thus locking the steering shaft.

The movable frame 9 has a cam surface 12 which is engaged with the cam protrusion 5 of the cam member 4. That is, as the cam member 4 turns, the cam protrusion 5 is slid on the cam surface 12, thus moving the movable frame 9. An engaging portion comprising an engaging recess 14 is formed in the outer surface of the movable frame 9 in such a manner that an end portion 13a of a key response member comprising a locking lever 13 can be brought into and out of engagement with the engaging recess 14. The locking lever 13 is pivotably supported at its middle by the casing 3. When the key is not inserted into the key rotor 1, a spring 23 acting on the locking lever 13 urges the end portion 13a to swing in the direction of the arrow B to move away from the movable frame 9 as indicated by the solid lines in FIG. 2. When the key is inserted into the key rotor 1, the end portion 13a is swung in the direction opposite to the direction of the arrow B possibly engaging the engaging recess 14 as indicated by the dotted lines, depending on the position of the movable frame 9.

Figure 4:
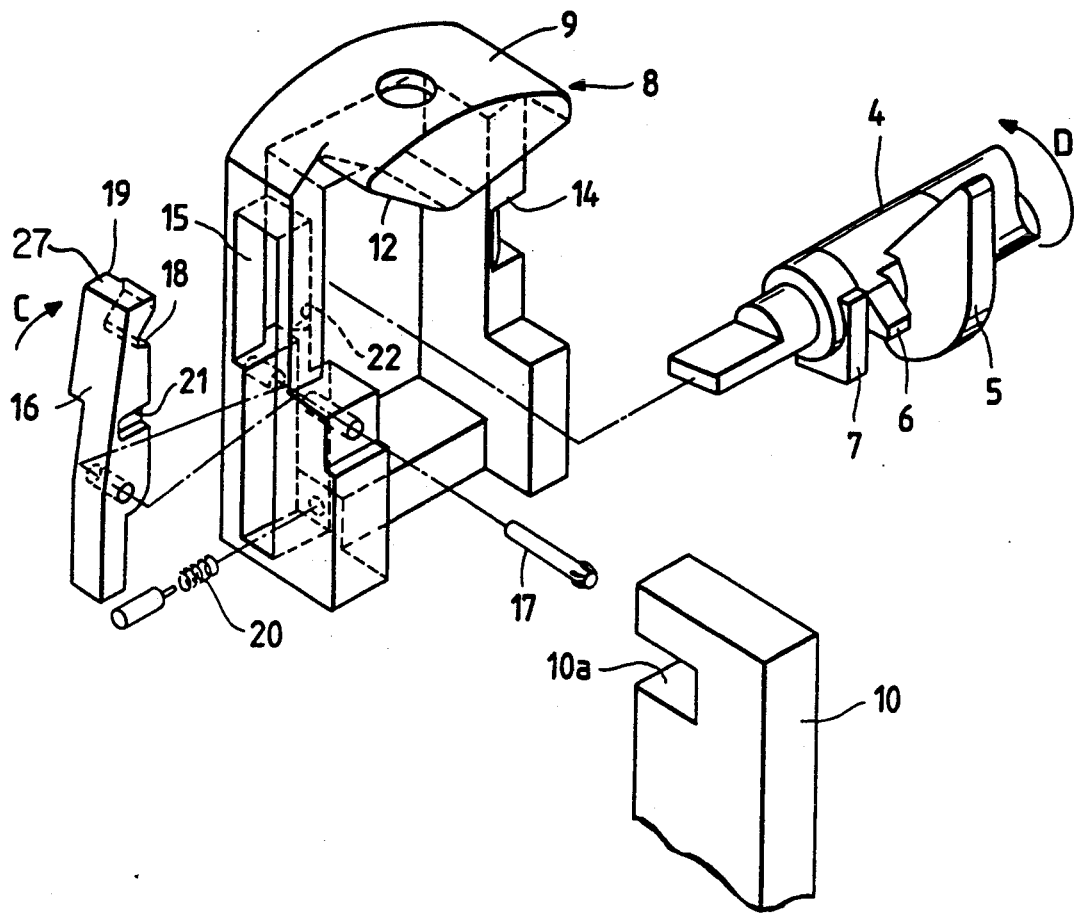
FIG. 4 is an exploded perspective view showing essential components of the steering shaft locking device according to the present invention.

An opening 15 is formed in the side of the movable frame 9 opposite to the side where the engaging recess 14 is formed. A stopper member 16 is pivotably provided in the opening 15 about a pin 17. As shown in FIG. 4, the stopper member 16 has a groove or indentation 18 and a cut 19 which are formed for engaging the locking protrusion 6 and the auxiliary cam 7 of the cam member 4, respectively. At the lockable position, the groove 18 is engaged with the locking protrusion 6 of the cam member 4 when the end portion of the lock bar 10, being not in alignment with the groove 24 formed in the collar 25, is abutted against the outer surface of the collar. The stopper member 16 is urged in the direction of the arrow C by a compression spring 20 to move its top portion (as shown in the Figures) towards the movable frame 9. The stopper member 16 has a guide groove 21 in its side, which is engaged with a regulating protrusion 22 formed on the wall of the opening 15 so as to limit the amount of rotation of the stopper member 16 towards the movable frame 9 to a predetermined value.

The operation of the steering shaft locking device thus constructed will be described.

Figure 1A:
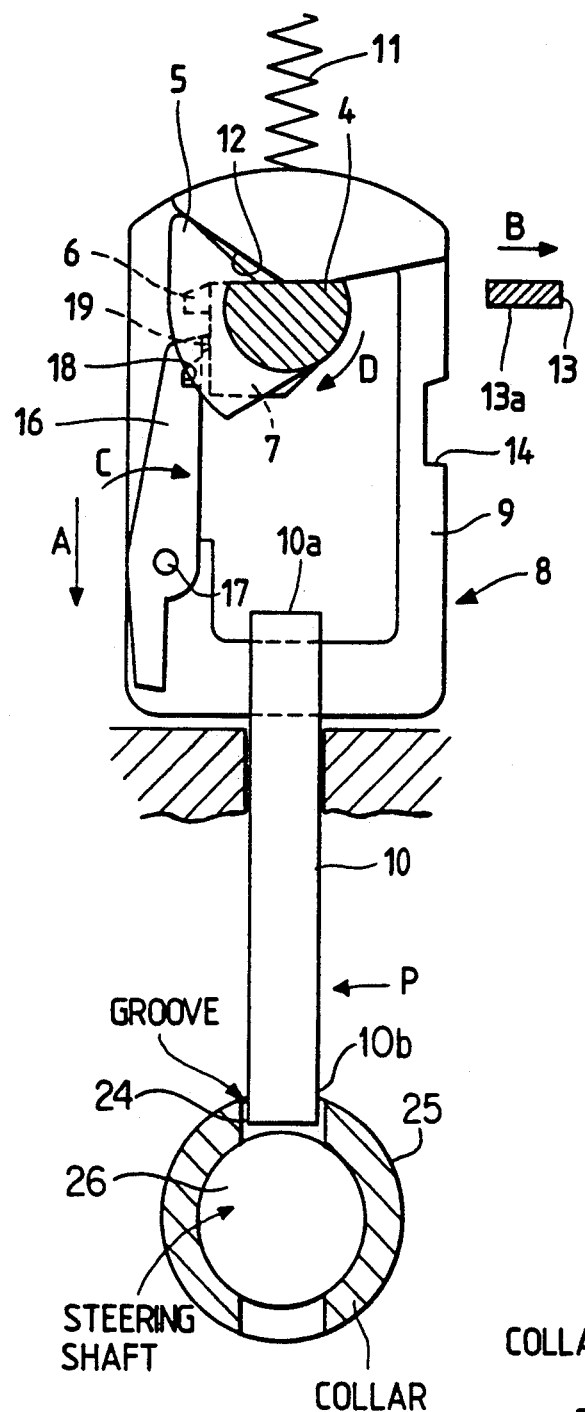
FIG. 1A is a front partial sectional view showing the operation of essential components in one example of a steering shaft locking device according to the present invention with the locking member in the lock position.
Figure 1B:
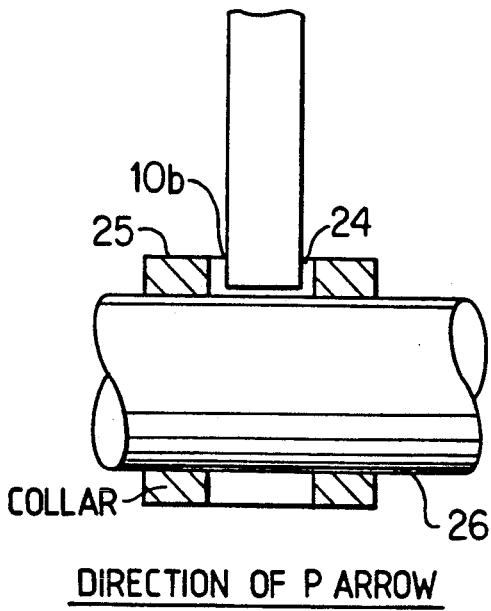
FIG. 1B is a partial sectional view of the steering shaft locking device from the direction of P arrow in FIG. 1A.

FIG. 1A shows the device when the key rotor 1 is at the LOCK position, and the key is not inserted into it. In this state, the locking member 8 is at the lock position, and the end portion 10b of the lock bar 10 is engaged with the groove 24 formed in the collar 25, so that the steering shaft 26 is locked. In this case, the locking lever 13 is swung in the direction of the arrow B in such a manner that its end portion 13a is held away from the movable frame 9. In addition, the locking protrusion 6 of the cam member 4 is disposed slightly above the stopper member 16.

When, in the case where the state of the locking device is as shown in FIG. 1A, the key is inserted into the key hole 2 of the key rotor 1, the locking lever 13 is swung in the direction opposite to the direction of the arrow B, so that the end portion 13a of the locking lever 13 is abutted against the outer surface of the movable frame 9. When, under this condition, the key rotor 1 is turned in the direction of the arrow D with the key thus inserted, the cam member 4 is turned together with the key rotor 1 in the same direction. As a result, the cam protrusion 5 of the cam member 4 is slid on the cam surface 12 of the movable frame 9, so that the movable frame 9 and accordingly the locking member 8 is moved in the direction opposite to the direction of the arrow A.

Figure 6:
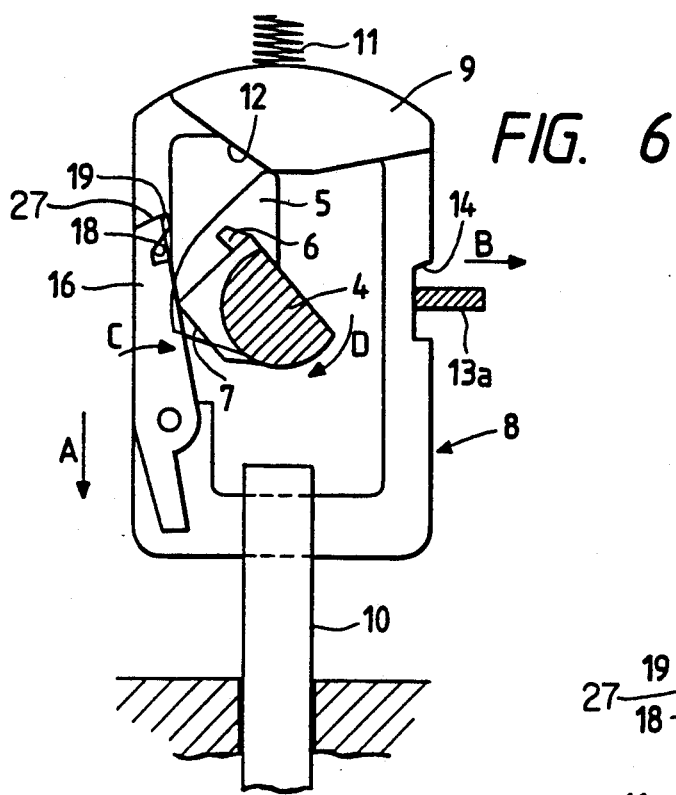
FIG. 6 is a front partial sectional view showing essential components of the steering shaft locking device according to the present invention with the key rotor rotated from the lock position.
Figure 7:
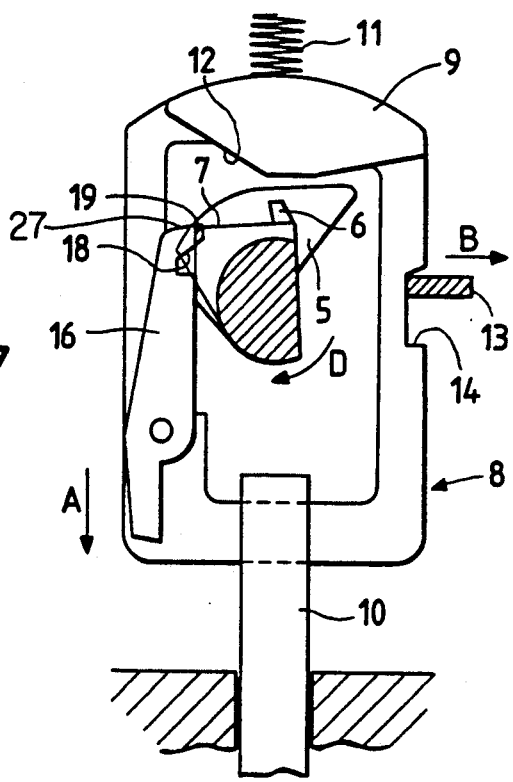
FIG. 7 is a front partial sectional view showing essential components of the steering shaft locking device according to the present invention with the key rotor further rotated from the lock position.

When the key rotor 1 is turned to the ACC position, as shown in FIG. 6, the engaging recess 14 reaches the end portion 13a of the locking lever 13, so that the end portion 13a of the locking lever 13 enters the engaging recess 14 due to the force of the spring 23. As a result, the movable frame 9, and accordingly the locking member 8, is held at the release position. In this operation, the end portion 10b of the locking lever 10 is disengaged from the groove 24 formed in the collar 25, so that the steering shaft 26 is unlocked. If, in this case, the key rotor 1 is turned to the ON position or the START position, the movable frame 9 is held at the release position by the end portion 13a of the locking lever 13. FIG. 7 shows the key rotor 1 turned to the ON position with the auxiliary cam 7 disposed within the cut 19 of the stopper member. As the key rotor 1 turns, the auxiliary cam 7 of the cam member 4 is turned, so that the stopper member 16 is swung while being guided by the auxiliary cam 7.

Figure 8:
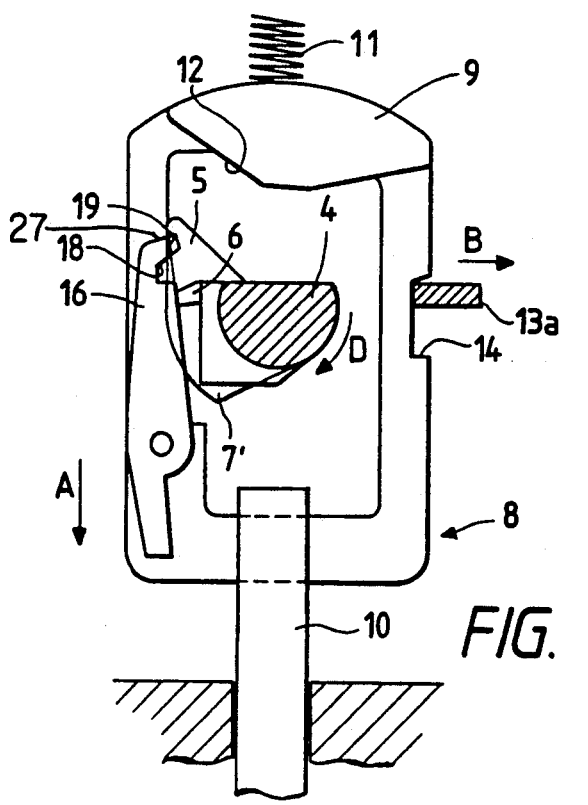
FIG. 8 is a front partial sectional view showing essential components of the steering shaft locking device according to the present invention with the locking member held in the release position.

When the key rotor 1, held as shown in FIG. 7, is turned in the direction opposite to the direction of the arrow D to the LOCK position, the end portion of the locking protrusion 6 is positioned below the groove 18 formed in the stopper member 16 as shown in FIG. 8. Locking protrusion 6 can not enter groove 18 because the end portion 13a of the locking lever 13 is positioned within the engaging recess 14, and therefore the movable frame 9, and accordingly the locking member 8, is held at the release position.

When, under this condition (as shown in FIG. 8), the key is removed from the key rotor 1, the end portion 13a of the locking lever 13 is moved in the direction of the arrow B; that is, it is disengaged from the engaging recess 14. As a result, the movable frame 9 and accordingly the locking member 8 is moved towards the lock position (in the direction of the arrow A) by the elastic force of the spring member 11. If the end portion 10b of the lock bar 10 is in alignment with the groove 24 formed in the collar 25 and therefore engages it, the locking member 8 is moved to the lock position as shown in FIG. 1A. If, on the other hand, the end portion 10b of the lock bar 10 is not in alignment with the groove 24 formed in the collar 25 and therefore abuts against the outer surface of the collar, the locking member 8 is not moved to the lock position; that is, it is stopped at a lockable position as shown in FIG. 9A.

When, in the case where the state of the locking device is as shown in FIG. 1A, the locking member 8 is pushed in the direction opposite to the direction of the arrow A (upwardly in FIG. 1A) by some method, it may be moved until the end portion or distal end 27 of the stopper member 16 strikes against the locking protrusion 6; however, it is impossible to further move the locking member 8 in the same direction. Hence, even if, in the case where the state of the locking device is as shown in FIG. 1A, the lock bar 10 is moved in the direction opposite to the direction of the arrow A with a dummy key inserted into the key hole 2, the locking member 8 will not be moved to the release position, and therefore the steering shaft 26 will not be unlocked.

Figure 9A:
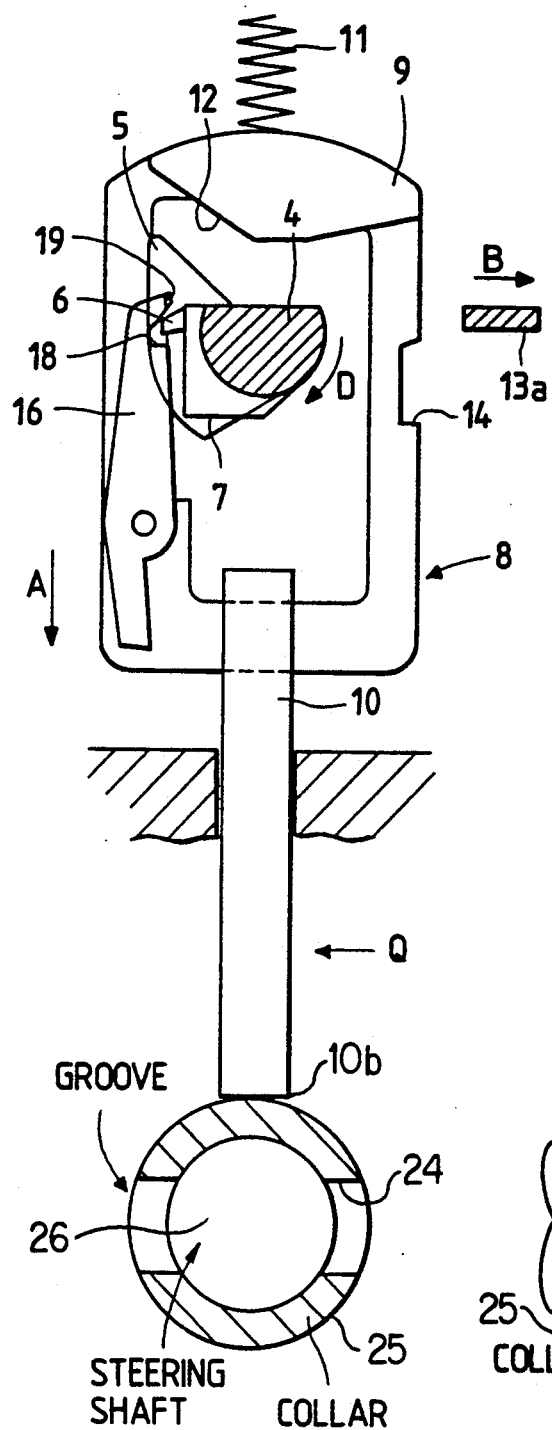
FIG. 9A is a front partial sectional view showing essential components of the steering shaft locking device according to the present invention with the locking member in a lockable position.
Figure 9B:
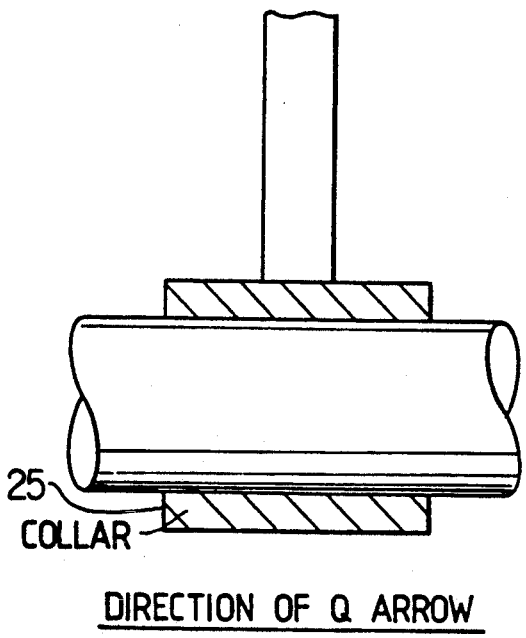
FIG. 9B is a partial sectional view of the steering shaft locking device from the direction of Q arrow in FIG. 9A.

In the case of FIG. 9A, the locking protrusion 6 is engaged with the groove 18 formed in the stopper member 16. If the locking member 8 is pushed in the direction opposite to the direction of the arrow A (upwardly in FIG. 9A) by some method similarly as in the above-described case, the lower portion of the groove 18 of the stopper member 16 will strike against the locking protrusion 6 from below, thus inhibiting the further movement of the locking member in the same direction. Thus, even where the state of the locking device is as shown in FIG. 9A, the lock bar 10 is moved in the direction opposite to the direction of the arrow A with a dummy key inserted into the key inserting hole 2, the locking member 8 will not be moved to the release position, and therefore the steering shaft 26 will not be unlocked. If, while the state of the locking device is as shown in FIG. 9A, the steering wheel is turned to cause the groove 24 of the collar 25 to engage with the end portion 10b the lock bar 10, the locking member 8 is moved by the spring member 11 to the lock position as shown in FIG. 1A.

As was described above, when the key rotor is turned to the locking position, the locking protrusion of the cam member contacts the stopper member mounted on the locking member, thus preventing the movement of the locking member to the release position. Hence, the locking member will not be moved to the release position unless the key rotor is turned to the operating position with the key. Since the locking protrusion is a part of the cam member, the steering shaft locking device of the present invention has fewer components and assembly steps than the conventional steering shaft locking device in which the cam plate and the cam member are provided separately.

While the present invention has been described in connection with the preferred embodiment of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A locking device for a steering shaft comprising:
 a key rotor having a locking position and a plurality of operating positions, said key rotor allowing a key to be inserted thereinto or extracted therefrom when positioned at said locking position and capable of being turned to said locking position and said operating positions with said key inserted thereinto;
 a cam member having an outer cylindrical surface and a cam protrusion extending from said outer cylindrical surface, said cam member being turned together with said key rotor;

a locking member which can be reciprocated between a lock position for locking the steering shaft and a release position for unlocking the steering shaft, and which is normally urged toward said lock position by a spring member, and is moved to said release position by said cam protrusion when said key rotor is turned to any one of said operating positions, said locking member including an engaging portion;

a key response member which is moved in a first direction when said key is inserted into said key rotor, and in a second opposite direction when said key is extracted from said key rotor, said key response member having an end portion which, when said key response member is moved in said first direction upon insertion of said key into said key rotor and said locking member is moved to said release position, engages said engaging portion to hold said locking member at said release position, and which, when said key response member is moved in said second opposite direction upon the extraction of said key from said key rotor, disengages said engaging portion, thus allowing the movement of said locking member to said lock position;

a stopper member coupled to said locking member, said stopper member including a stopper member distal end and a stopper member indentation spaced from said distal end; and a locking protrusion disposed on said cam member, said locking protrusion contacting, when said key rotor is turned to said locking position and said locking member is in said lock position, said stopper member distal end to inhibit the movement of said locking member to said release position, said locking protrusion also contacting said stopper member indentation to inhibit the movement of said locking member to said release position when said locking member is disposed between said lock position and said release position.

2. A locking device for a steering shaft according to claim 1, wherein said locking member includes a lock bar having a first end portion and second end portion, and a movable frame arranged as to surround said cam member, said device further comprising a collar having an outer surface defining a groove therein, said collar being mounted on the steering shaft, said first end portion of said lock bar secured to said movable frame and said second end portion of said lock bar for engaging said groove, and said stopper member indentation engaging said locking protrusion of said cam member when said second end portion of said lock bar, being not in alignment with said groove formed in said collar, is abutted against the outer surface of said collar to inhibit the movement of said locking member to said release position.

3. A locking device for a steering shaft according to claim 1, wherein said cam member includes an auxiliary cam axially spaced from said cam protrusion, said auxiliary cam contacting said stopper member when said key rotor is turned to said locking position to prevent said locking protrusion from engaging said stopper member indentation or said stopper member distal end.

4. A locking device for a steering shaft according to claim 3, wherein said stopper member includes a recessed cut portion for receiving said auxiliary cam.

5. A locking device for a steering shaft according to claim 1, wherein said stopper member is rotatably coupled to said locking member.

6. A locking device for a steering shaft according to claim 5, further including a coil spring urging said stopper distal member end toward said cam member.

* * * * *